W. R. ROYER.
LOCKING DEVICE FOR VALVE STEMS.
APPLICATION FILED JULY 20, 1921.
1,425,545.
Patented Aug. 15, 1922.
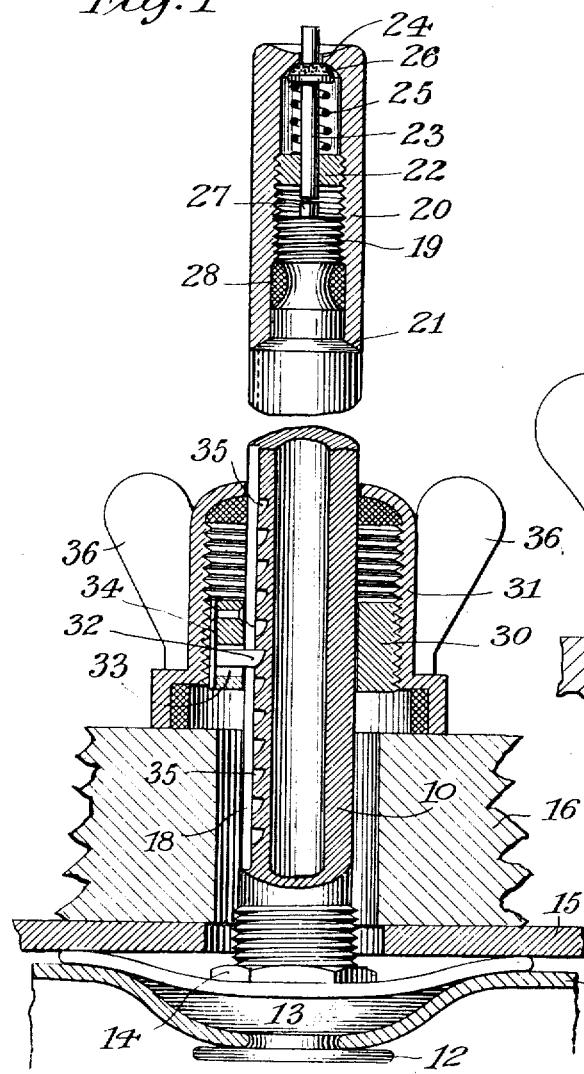
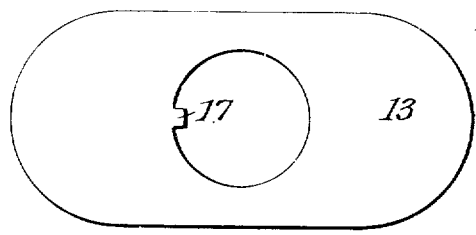
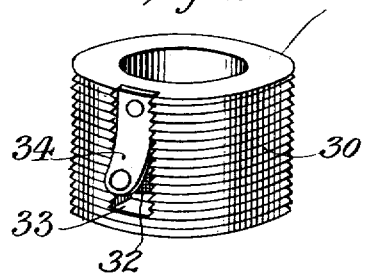
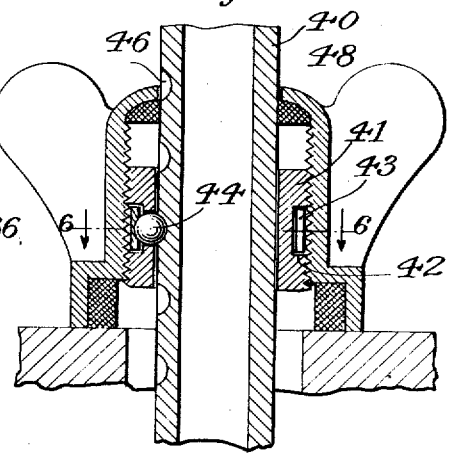
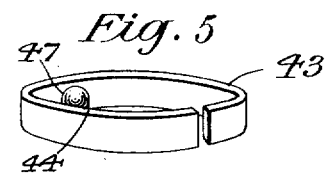
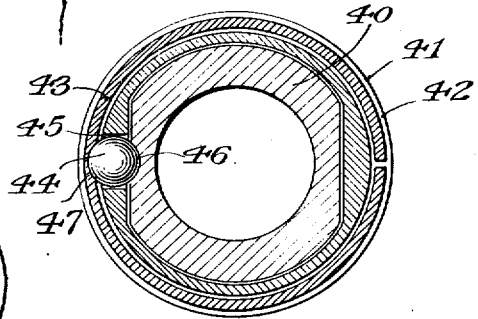
INVENTOR
W. R. Royer
BY
ATTORNEYS

UNITED STATES PATENT OFFICE.

WILLIAM R. ROYER, OF WILKES-BARRE, PENNSYLVANIA.

LOCKING DEVICE FOR VALVE STEMS.

1,425,545.  Specification of Letters Patent.  Patented Aug. 15, 1922.

Application filed July 20, 1921. Serial No. 486,120.

*To all whom it may concern:*

Be it known that I, WILLIAM R. ROYER, a citizen of the United States of America, residing at Wilkes-Barre, in the county of Luzerne and State of Pennsylvania, have invented certain new and useful Improvements in Locking Devices for Valve Stems, of which the following is a full, clear, and exact description.

The conventional valve stem used on pneumatic tires is threaded throughout its length, and is locked on the felloe by means of nut, and to make the stem more sightly it is usually covered by a so-called dust-cap, which screws down upon the nut. The stem projects in most cases several inches from the felloe, and hence to inflate the tire the cap must be unscrewed over that length. The result is that the driver often lets a tire run underinflated rather than undergo the tedious operation of unscrewing the cap and screwing it on again. Moreover, before the tire can be taken off the wheel the lock-nut must be removed.

I have accordingly been led to devise my present invention, which has for its object to provide a valve stem which can be securely locked to the felloe without the use of screw-threads on the stem itself. Being unthreaded the stem is not unsightly and hence does not need to be covered by a dust-cap to improve its appearance, thus eliminating one of the chief causes of neglecting to keep the tire fully inflated. My improved valve stem may have its outer end covered, if desired, by a small screw-cap of the type now commonly used inside of the dust-cap, which requires but a few turns to remove it, but I prefer to equip the stem with a valve-operating device of the general kind described in Stephens Patent No. 1,304,116, issued May 20, 1919. In such case the air-hose can be applied directly without removing anything from the stem when it is desired to inflate the tire. To these and other ends the invention consists in the novel features and combinations hereinafter described.

Of the various embodiments of which the invention is capable I have selected for illustration and specific description herein the two that at the present time are considered to exhibit the invention in its most convenient and effective forms. These embodiments are illustrated in the accompanying drawing, in which—

Fig. 1 is a longitudinal section.

Fig. 2 is a perspective view of the slip-collar, constituting part of the locking means employed in Fig. 1.

Fig. 3 is a plan view of the cleat used on the inner end of the valve stem in Fig. 1, outside of the inner tube of the tire.

Fig. 4 is a detail longitudinal section of another embodiment.

Fig. 5 is a perspective view of the spring used in Fig. 4.

Fig. 6 is a detail section on line 6—6 of Fig. 4.

The inner end of the valve stem 10 is largely of the conventional construction, in which the inner air-tube 11 is clamped between the terminal flange 12 and a removable cleat 13 by means of a nut 14 on the threaded inner end of the stem. The stem itself projects through the usual openings in the rim 15 and the felloe 16. To prevent twisting or turning of the cleat as the nut 14 is set up, the former may have a lug 17 extending inwardly into the lower portion of a groove 18 in the side of the stem, or one or both sides of the stem may be flattened to fit a correspondingly shaped opening in the cleat, as in the conventional design.

The upper or outer end of the valve stem 10 has a threaded reduced portion 19 to receive the internally threaded thimble 20, which may be screwed down firmly on the shoulder 21. Screwed into the thimble is a centrally apertured bushing or guide 22 for the sliding plunger 23, which also extends through an opening 24 in the top of the thimble. A coil spring 25, encircling the plunger between the cone 26 and guide 22, holds the cone snugly in its seat formed in the underside of the thimble and also holds the lower end of the plunger slightly above the upper end of the stem 27, which may be taken to represent the plunger of the conventional "valve insides." The top of the cone 26 may be of soft rubber or equivalent material to provide an airtight seal. To inflate the tire it is necessary only to apply the air-hose fitting to the end of thimble 20. This operation depresses the plunger 23, which in turn depresses the valve-plunger 27, thus allowing the air to enter freely. If the air-hose fitting is of the screw type, for example such as is commonly found on hand pumps, the thimble can be unscrewed and the fitting screwed down on the threaded end 19. If desired, the upper end of the thimble can be threaded to receive the pump-hose fitting, as in the Stephens patent referred to above.

To seal the thimble 20 on the stem the latter may be provided with a yielding gasket 28 in a circumferential groove under the threaded portion 19, as shown, so as to be compressed by the thimble 20 when the latter is screwed down upon the shoulder 21.

For the purpose of locking the valve stem to the felloe I provide a slip collar 30 and a locking sleeve 31. The former is adapted to slide on and off the stem but is equipped with a beveled tooth or stud 32 playing in an opening 33 and carried by a light spring 34 fixed on the collar, to engage one or another of a series of recesses 35 in the slot 18. The locking sleeve 31 screws down on the collar 30 and is provided with wings 36 for convenient grasp by the fingers and thumb.

When the sleeve 31 is screwed down as in Fig. 1 the stud 32 is held by the sleeve in engagement with the recess. When the sleeve is screwed up until it clears the stud the sleeve and collar assembly can be pulled off the stem, the stud being lifted out of the recesses by the spring 34. The valve stem is then free and the tire can be removed. To re-lock the stem the collar and sleeve are pressed down as far as they will go, the stud 32 finally engaging one or another of the recesses. The sleeve is then screwed down. Since the collar cannot rotate (being prevented from turning by the stud projecting into the groove 18) the sleeve must descend and the collar must rise, thereby drawing the cleat 13 firmly up against the underside of the rim 15 and bringing the sleeve down with equal firmness upon the upper surface of the felloe 16. Since the axial movement of the locking sleeve, to release or lock the collar, need not be more than a fraction of an inch, say a quarter or three-eighths, a few turns of the sleeve are sufficient for either operation.

In the embodiment shown in Figs. 4, 5 and 6 the valve stem 40 is flattened on opposite sides and the collar 41 may be similarly shaped inside, as indicated. Around the collar is a groove 42 to receive the split spring ring 43 which serves to hold the steel ball 44 in the opening 45 in the collar and in one of the recesses 46 in the side of the stem. The ring 43 may have a recess 47 to receive the ball and prevent rotation of the ring itself. When the locking sleeve 48 is backed off far enough to clear the ring the sleeve and collar can be drawn off the stem, the spring 43 permitting the locking ball to be cammed out of the recesses 46 as the latter are passed. When the sleeve is screwed down over the spring the latter cannot expand and hence the ball cannot escape from its recess 46. The result is that the collar is forced to rise in the sleeve, carrying the valve stem with it until the cleat (not shown) is drawn up firmly against the rim. At the same time the sleeve 48 seats itself on the felloe.

It is to be understood that the invention is not limited to the specific construction herein illustrated and described but can be embodied in other forms without departure from its spirit.

I claim—

1. In a device for the purpose described, in combination, a wheel felloe, a valve stem extending through the felloe and having an unthreaded portion exposed beyond the felloe, and releasable means cooperating with said unthreaded portion of the valve stem to lock the latter in the felloe.

2. In a device for the purpose described, in combination, a wheel felloe, a valve stem extending through the same and having an unthreaded portion exposed beyond the felloe, a ratchet collar adapted to engage the said unthreaded portion of the valve stem to lock the latter in the felloe, and manually releasable means to hold the ratchet collar in engagement with the valve stem.

3. In a device for the purpose described, in combination, a wheel felloe, a valve stem extending through the felloe, a longitudinally shiftable ratchet-device adapted to engage the valve stem to draw the same radially inward, and manually operable means to shift said ratchet-device and prevent disengagement thereof from the valve stem.

4. In a device for the purpose described, in combination, a wheel felloe, a valve stem extending through the felloe, a longitudinally shiftable ratchet-device associated with the valve stem to lock the same in the felloe and manually rotatable means having screw-thread engagement with said ratchet device to actuate the same.

5. In a device for the purpose described, in combination, a wheel felloe, a valve stem extending through the felloe and provided with ratchet recesses, a collar on the valve stem and carrying a member adapted to releasably engage the stem in one or another of the recesses thereof, and manually operable means to shift the collar radially inward and maintain said member in engagement with the stem.

6. In a device for the purpose described, in combination, a wheel felloe, a valve stem extending through the same and having a series of ratchet recesses, an externally threaded collar surrounding the stem and having an outwardly yielding member to releasably engage one or another of said ratchet recesses, and an internally threaded manually rotatable sleeve cooperating with said collar, to shift the same and the stem radially inward and maintain said member in engagement with the recess.

7. In a device for the purpose described, in combination, a valve stem having a recess, a collar surrounding the stem and having an outwardly yielding member to engage the ratchet recess but permitting the collar to be slipped axially on and off the stem, and a manually operable sleeve cooperating with the collar to maintain said member in engagement with said recess.

8. In a device for the purpose described, in combination, a valve stem having a recess, an externally threaded collar surrounding the stem and having an outwardly yielding member adapted to engage the recess, and an internally threaded sleeve cooperating with the collar to maintain said member in engagement with the recess but shiftable relatively to the collar to permit disengagement of the member.

9. In a device for the purpose described, in combination, a valve stem having a recess, an externally threaded collar surrounding the stem, a radially movable device carried by the collar to engage said recess and having its outer end adjacent to the outer surface of the collar, and a sleeve threaded on the collar and shiftable thereon to prevent or permit outward movement of said device, as desired.

10. In combination, a felloe, a valve stem extending through the felloe and having a series of ratchet recesses, a collar surrounding and movable axially on the stem, a spring-actuated member carried by the collar to engage one or another of the recesses therein but permitting axial movement of the collar, and manually operable means to maintain the member in engagement with the recess and shift the collar and stem radially inward.

In testimony whereof I hereto affix my signature.

WILLIAM R. ROYER.